UNITED STATES PATENT OFFICE.

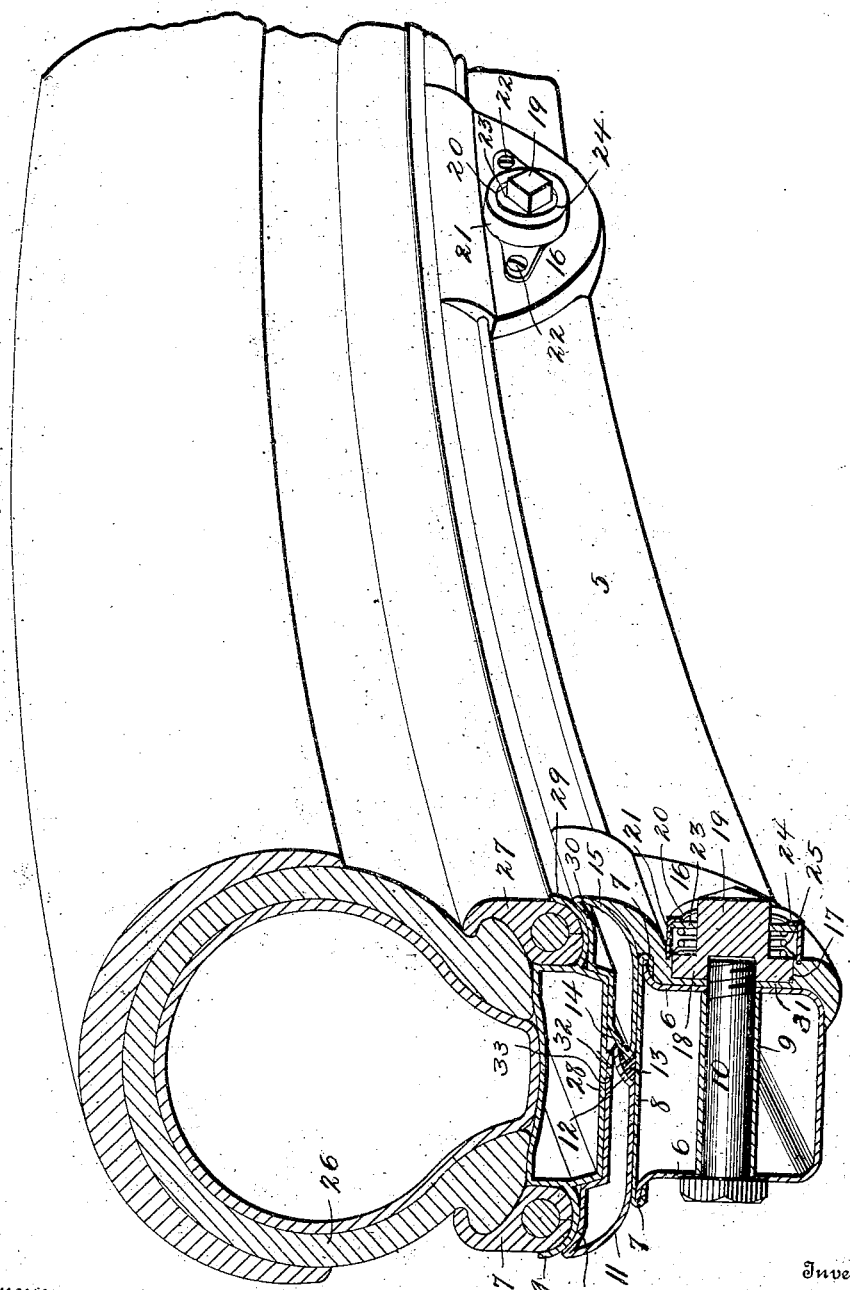

PETER EBNER, OF COLUMBUS, OHIO.

VEHICLE-WHEEL.

No. 914,710.

Specification of Letters Patent.

Patented March 9, 1909.

Application filed July 19, 1907. Serial No. 384,537.

*To all whom it may concern:*

Be it known that I, PETER EBNER, a citizen of the United States, residing at Columbus, in the county of Franklin and State of Ohio, have invented certain new and useful Improvements in Vehicle-Wheels, of which the following is a specification.

My invention relates to vehicle wheels and more particularly to automobile wheels, the object of the invention being to provide a wheel of this character constructed in such manner that the rim thereof is removable from the felly of the wheel, said rim being provided with means for securing it to the usual pneumatic tire.

In practice the removable rim is secured to the tire by clencher beads in the usual and well known manner. If, therefore, the pneumatic tire in use upon the wheel becomes punctured, it is but necessary to remove the rim to which it is secured, from the wheel and substitute another rim carrying another tire, for the one that is punctured. This provides means for making the repairs very quickly and obviates the necessity of patching the tires while on the road. A rim containing a punctured tire may be removed and another substituted therefor, in a very few minutes, while the patching of a punctured tire is quite a lengthy task. It will therefore be seen that a structure such as is herein shown and described, is not only desirable for every day use, but is particularly desirable upon racing cars where the loss of a few minutes may mean the loss of a race.

It is a further object of the invention to accomplish the foregoing objects by providing a structure which may be made of rolled sheet metal.

Further objects and advantages of the invention will be set forth in the detailed description which now follows:

The figure shown in the accompanying drawing is a view partially in section and partially in perspective of the felly, rim and tire of a wheel constructed in accordance with the invention.

Referring to the drawing, the numeral 5 designates the felly of the wheel. This felly may be made of rolled sheet metal as indicated in the drawing, or it may be an ordinary wooden felly. When the felly is made of sheet metal, it comprises an annular U-shaped portion 5, the upper edges of which are outturned as at 6. The edges 7 of an annular plate 8 are turned over the edges 6 to bind these parts together, it being understood that these parts will thereafter be brazed together. Tubular members 9 span the felly and are braced thereto, said tubular members being provided for the reception of bolts 10, said bolts serving a purpose which will be hereinafter described.

Brazed to the portion 8 of the felly, is a fixed retaining member 11. This fixed retaining member is provided with an undercut portion 12 and an annular rubber gasket 13 is adapted to be forced into this undercut portion by the reduced edge 14 of a movable retaining member 15. Brazed to the removable retaining member 15 and practically integral therewith are the enlarged depending bearing plates 16, these bearing plates 16 conforming to the shape of the felly and lying snugly thereagainst when the parts are in their assembled positions. The bearing plates 16 are recessed as at 17 for the reception of nuts 18, said nuts being adapted to be threaded upon the ends of the bolts 10 and said nuts being provided with angular heads 19 to which a wrench may be applied, as will be hereinafter described. The heads of these nuts project through the open portions 20 of cap plates 21, these cap plates being secured by screws 22 to the bearing plates 16. Washers 23 serve to prevent the entrance of mud, dirt or water to the interior of the cap plates. These washers are normally forced outwardly against the over-turned edges 24 of the cap plates by springs 25, said springs bearing between said washers and the nuts 18. A clencher tire of the usual and well known construction is indicated at 26. This clencher tire is secured by clencher beads 27 to the removable rim. This rim comprises a body portion 28, the lower face of which is adapted to rest upon the fixed retaining member 11 and the removable retaining member 15, and curved flanges 29, said flanges 29 receiving and supporting the clencher beads. The retaining members 11 and 15 are provided with portions 30 shaped to conform to the flanges 29 and bearing and supporting said flanges.

The operation of the device is as follows: Assuming that it is desired to remove the tire shown in the drawing and substitute another therefor, the operator applies a wrench to the heads 19 of the nuts 18 and unscrews said nuts from the threaded ends of the bolts 10. When all of these nuts have been thus loosened, the removable retaining member 15 may be pulled away from the felly and the rim and the tire carried thereby, may be slipped bodily toward the right and from the fixed retaining member and consequently from the felly. During this operation of removing the retaining member 15, the springs 25 aid in forcing said member outwardly, for the springs normally tend to force the nuts 18 inwardly, but since the nuts are at this time being backed off of the bolts 10 and are acting against said bolts, the thrust of the springs is brought to bear against said bolts to force the member 15 and the parts carried thereby, away from the felly, it being understood that the bolts 10 are driven into position with a driving fit and are so tightly held that they always remain in position in the felly.

By virtue of this construction, if repairs have to be made in the dark, the operator has no lost bolts to contend with, for after the new rim has been slipped in position upon the fixed retaining member 11 and the removable retaining member 15 is forced on to the felly to hold said rim in position, the bolts 10 will always be found in place, nor is it possible for the nuts 18 to drop out or become lost, for they are held against movement to the right by the springs 25 and the overhanging flanges 24 of the caps, and they are held against movement to the left by the rear walls 31 of the bearing plates 16. When the rim is slipped into position, a short dowel 32 enters a cut-out portion 33 of the fixed retaining member to prevent the rim from creeping with relation to said retaining member.

The provision of the gasket 13 provides a water-tight joint between the fixed retaining member and the removable retaining member. It has been found that water gets in around the base of the pneumatic tire and tends to rot the rubber and canvas. It cannot get in around the beads 27, for they grip the rubber beads 34 of the tire 26 with such force as to provide a water-tight joint at that point. It ordinarily passes in around the inflating valve stem (not shown). Now, of course only a very small quantity of water could get in around the valve stem itself, but it has been found that where the retaining members are left with an unprotected space between them, that any water that enters said space anywhere around the circumference of the wheel, travels around said unprotected space until it reaches the valve stem and then follows the valve stem up to the inner portion of the pneumatic tire. It is to prevent this that the gasket 13 is provided, said gasket being compressed between the point of the member 15 and the portion 12 of the member 11 to form a water-tight joint as has been before stated. Any desired number of bearing plates 16, bolts 10 and nuts 18 may be provided about the periphery of the wheel, as will be readily understood.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

What I claim, is:

1. In a device of the character described, the combination with a felly, of a fixed retaining member, a movable retaining member, rotative fastening devices carried by one of said retaining members, fastening devices adapted to be engaged by said rotative fastening devices, and means for holding said rotative fastening devices in position upon the retaining member by which it is carried when said fastening devices are disengaged from each other.

2. In a device of the character described, the combination with a felly, of a fixed retaining member, a removable retaining member, a rim adapted to be clamped between said retaining members, bolts passing through said felly, nuts carried by the removable retaining member and adapted to engage said bolts, inclosing casings, washers located within said inclosing casings and surrounding the heads of the nuts, and springs bearing between said washers and said nuts.

3. In a device of the character described, the combination with a felly, of a fixed retaining member, a removable retaining member, a rim adapted to be clamped between said retaining members, means for clamping a tire to said rim, and means normally tending to force the removable retaining member away from the fixed retaining member.

In testimony whereof I affix my signature in presence of two witnesses.

PETER EBNER.

Witnesses:
A. L. PHELPS,
L. CARL STOUGHTON.